Figure 3:
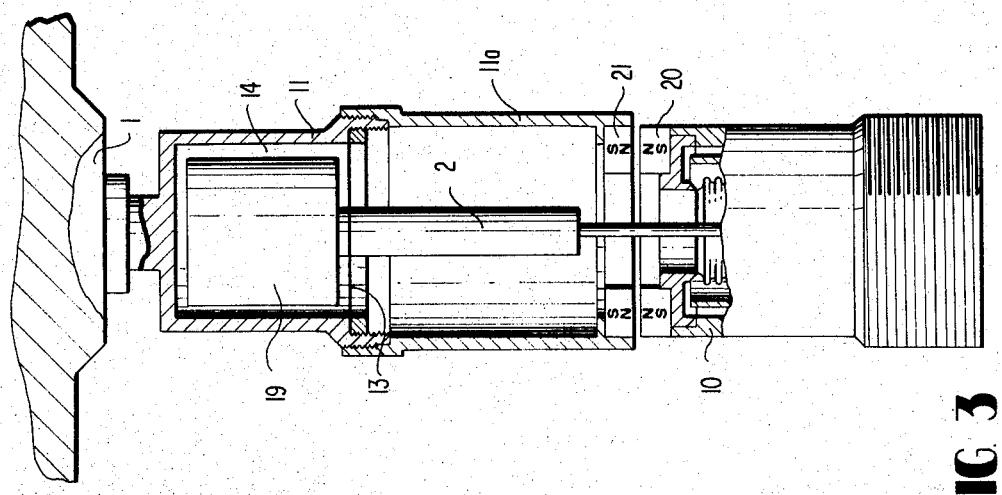

United States Patent [19]
Lieb

[11] 3,856,200
[45] Dec. 24, 1974

[54] DAMPING DEVICE FOR RAPIDLY SPINNING ROTARY BODY

[75] Inventor: Helmut Lieb, Unterhaching, Germany

[73] Assignee: Maschinenfabrik Augsburg-Nurnberg AG, Munich, Germany

[22] Filed: May 11, 1972

[21] Appl. No.: 252,192

[30] Foreign Application Priority Data
May 13, 1971 Germany............................ 2123654

[52] U.S. Cl.............. 233/1 C, 102/DIG. 4, 308/10
[51] Int. Cl........................................... B01d 21/26
[58] Field of Search ............ 308/9, 10, 160; 74/5.5; 233/1 C; 102/DIG. 4

[56] References Cited
UNITED STATES PATENTS

| | | |
|---|---|---|
| 2,809,526 | 10/1957 | Lundberg...................... 308/10 UX |
| 3,216,655 | 11/1965 | Wind et al. ...................... 308/10 X |
| 3,397,439 | 8/1968 | Hanau................................ 308/9 X |
| 3,493,275 | 2/1970 | Stone et al............................ 308/10 |
| 3,614,180 | 10/1971 | Beer..................................... 308/10 |

Primary Examiner—Benjamin A. Borchelt
Assistant Examiner—H. J. Tudor
Attorney, Agent, or Firm—Craig & Antonelli

[57] ABSTRACT

A damping device for a rotating body spinning at high speeds and supported in an axially and/or radially damped thrust bearing, in which a magnet system is arranged in the housing, which is securely coupled to the rotating body, and in the damping member immersed in the damping oil within the housing; the magnet system consists of two poles disposed mutually opposite and of like polarity to produce a repelling force between the poles.

10 Claims, 3 Drawing Figures

PATENTED DEC 24 1974　　3,856,200

DAMPING DEVICE FOR RAPIDLY SPINNING ROTARY BODY

The present invention relates to a device for damping a rapidly spinning rotary body, more particularly a rotating barrel of a centrifuge, which is supported in an axially and/or radially damped thrust bearing, whereby a housing which is almost completely filled with a damping oil and is positively coupled with the rotary body, is arranged between the rotary body and the thrust bearing, a damping member which is movably connected with respect to the housing and which is also movable against a restoring force relative to the housing, being immersed in the housing and whereby the housing is connected, through a flexible bearing support, with a trunnion which is carried in the thrust bearing and axially supports the damping member.

Such a damping device which is described in German Patent 1,575,264 is installed between the rotary body and the thrust bearing for rotational support in order to damp additional bending or flexural vibrations, so-called "whirls," which are independent of the rotational speed of the rotary body. In this arrangement the damping member is movably connected with the housing by means of a diaphragm and also by means of radially disposed springs.

This prior art damping device is not suited for extremely rapidly spinning rotary bodies because in that case the centrifugal forces produced during the rotation will compress the springs and thus render any restoring force thereof ineffectual. This prevents the damping of bending or flexural vibrations.

The task of the present invention resides in providing a damping device of the aforementioned type which assures a safe damping of bending or flexural vibrations or whirls also at extremely high rotational speeds, whereby the restoring force for the damping member is independent of the rotational speed.

The present invention essentially consists in that a system of magnets is arranged in both the housing and the damping member which consists of two magnetized poles facing one another and having the same sign or polarity.

In order to produce the restoring force for the damping member so that it is maintained in its position along the axis of rotation, according to one embodiment of the present invention one axially magnetized ring magnet of like polarity is axially arranged in each of the housing and the damping member.

Additionally it is proposed within the scope of the present invention to insert a radially magnetized sleeve into the housing, in the interior space of which immerses a magnetized damping member of like polarity. According to a further feature of this invention the housing of the thrust bearing carries at its end face an axially magnetized ring magnet which is opposed by a second, axially magnetized copolar ring magnet positively connected with the rotating housing.

The installation of a system of magnets in the housing and in the damping member ensures that the restoring force for the damping member in the housing, and hence the damping of bending or flexural vibrations, remains effectively the same also at extremely high rotational speeds.

Figure 2:
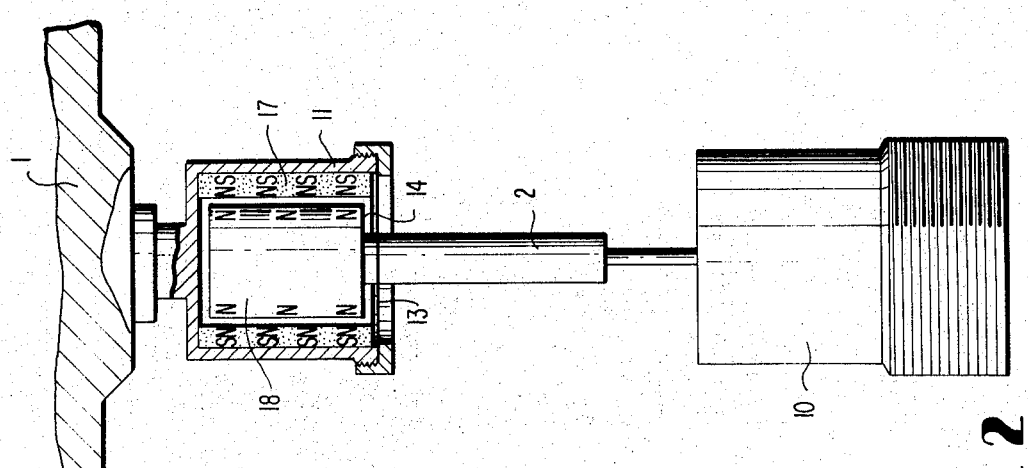
Figure 1:
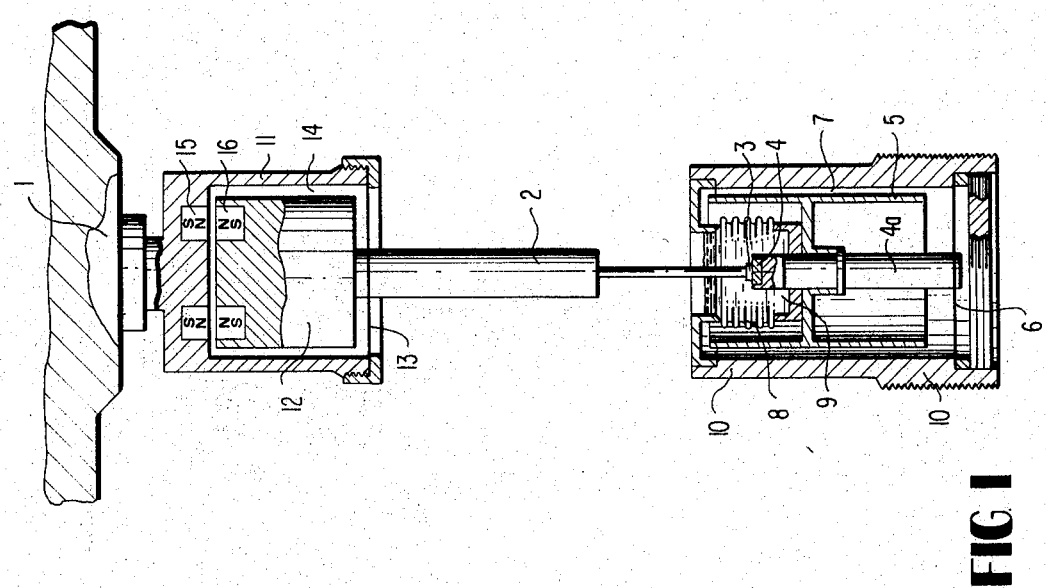

These and further objects, features and advantages of the present invention will become more apparent from the following description when taken in conjunction with the accompanying drawing which shows for purposes of illustration only, several embodiments of the present invention, and wherein FIG. 1 is an axial cross sectional view through a damping device according to the present invention for a rapidly rotating body supported in a thrust bearing;

FIG. 2 is an axial cross sectional view through a modified embodiment of a damping device according to the present invention, and FIG. 3 is an axial cross sectional view through a still further modified embodiment of a damping device according to the present invention.

Referring now to the drawing wherein like reference numerals are used throughout the various views to designate like parts, and more particularly to FIG. 1, reference numeral 1 designates in this figure a rotary body which spins about its vertical axis and rests, by way of a bearing pin or trunnion 2 terminating in a spherical end 3, in a bearing cup 4. The bearing cup 4 is arranged in a damping cylinder 5 and is supported by a diaphragm 6 by way of an intermediate bolt 4a. The space 7 is completely filled with damping oil and is sealed against the lubricating oil 9 by means of a flexible metal bellows 8. The entire unit is installed in a housing 10 of the thrust bearing.

The damping device intervening between the thrust bearing and the rotary body is arranged and constructed such that the housing 11 is securely connected with the rotary body 1. The bearing pin or trunnion 2 carries a damping member 12 in the shape of a cylindrical body and is connected with the housing 11 by way of a diaphragm 13. The housing 11 is almost entirely filled with damping fluid 14. Two axially magnetized ring magnets 15 and 16 are arranged opposite one another within the area of the upper end force of the damping member 12, whereby one magnet 16 is arranged in the damping member 12 and the other magnet 15 in the housing 11. Since the adjacent poles of the ring magnets 15 and 16 which have like polarity are disposed opposite one another, they cause repulsion between the magnets. It is the repulsion between the magnets and the elasticity of the diaphragm 13 which provide the restoring force. If desirable, the flexible diaphragm type of support can be substituted with an articulated joint bearing.

In the embodiment according to FIG. 2 a radially magnetized sleeve 17 is inserted into the housing 11 which is filled with a damping fluid 14. The cylindrical damping member 18, which is also magnetized, is immersed in the interior space of the sleeve 17. The sleeve 17 and the damping member 18 are magnetized in such a manner that poles of like sign face each other. In this embodiment the restoring force is provided by means of the diaphragm 13 and the repulsion between the magnets 17 and 18. As in the first embodiment in accordance with this invention, the diaphragm may be replaced with an articulated joint bearing if desirable. The thrust bearing of any conventional construction provided to support the trunnion 2 is here schematically indicated by the thrust bearing housing 10. According to a further development of the present invention the principle of concentrically arranged radially magnetized ring magnets with poles of like sign facing one another, can equally be used for the damping at the thrust bearing.

The embodiment of FIG. 3 distinguishes itself from the previously described embodiments essentially in that the housing 11 which is connected with the rotary body 1, in turn adjoined by a second housing 11a. The housing 11 of the damping device of the present invention is again positively connected with the rotary body. The bearing pin or trunnion 2 carries a damping member 19 which is completely immersed in the damping oil 14 contained in the housing 11. This housing 11 is connected with the trunnion 2 by way of a diaphragm 13 and is hermetically sealed. The housing 10 of the thrust bearing carries at its upper end face an axially magnetized ring magnet 20. Arranged opposite this magnet 20 is a second axially magnetized ring magnets 21 which is positively connected with the rotating housing 11a. The magnets 20 and 21 are so arranged and installed that the poles facing one another have the same sign to produce the restoring force by way of repulsion. If desirable, the ring magnet 21 may be replaced with a steel ring, and the diaphragm 18 with an articulated joint bearing.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A device for damping a rapidly spinning rotary body supported in a damped thrust bearing means, which includes a housing nearly completely filled with a damping oil arranged between the rotary body and the thrust bearing means and positively coupled with the rotary body, and a damping means immersed in said housing, said damping means being movably connected with the housing and being movable against a restoring force relative to the housing, and the housing being connected, by way of a flexible support means, with a bearing pin which is carried in the thrust bearing means and axially supports the damping means, characterized by a system of magnets arranged in both the housing and the damping means including magnet means forming two magnetized poles of the same sign which are disposed mutually opposite one another.

2. A damping device according to claim 1, characterized in that an axially magnetized copolar ring magnet forming part of said magnet means is axially arranged in both the housing and in the damping means.

3. A damping device according to claim 1, characterized in that a radially magnetized sleeve means forming part of said magnet means is inserted into the housing, and a magnetized copolar damping member also forming part of said magnet means immerses into the interior space of said sleeve means.

4. A damping device according to claim 1, characterized in that the housing of the thrust bearing means carries at its upper end face an axially magnetized ring magnet which is opposed by a second, axially magnetized copolar ring magnet which is positively connected with the rotating housing.

5. A damping device according to claim 1, characterized in that the damping means is formed by an essentially cylindrical body.

6. A device according to claim 5, characterized in that the rotary body is a rotating barrel of a centrifuge.

7. A device according to claim 6, characterized in that the thrust bearing means is an axially and/or radially damped thrust bearing.

8. A damping device according to claim 5, characterized in that an axially magnetized copolar ring magnet forming part of said magnet means is axially arranged in both the housing and in the damping means.

9. A damping device according to claim 5, characterized in that a radially magnetized sleeve means forming part of said magnet means is inserted into the housing, and a magnetized copolar damping member also forming part of said magnet means immerses into the interior space of said sleeve means.

10. A damping device according to claim 5, characterized in that the housing of the thrust bearing means carries at its upper end face an axially magnetized ring magnet which is opposed by a second, axially magnetized copolar ring magnet which is positively connected with the rotating housing.

* * * * *